Aug. 11, 1953 — W. D. MOUNCE — 2,648,837
PULSED SOUND SYSTEM
Filed March 10, 1952

INVENTOR.
WHITMAN D. MOUNCE,
BY Dwight C. Otis
AGENT.

Patented Aug. 11, 1953

2,648,837

UNITED STATES PATENT OFFICE 2,648,837

PULSED SOUND SYSTEM

Whitman D. Mounce, Houston, Tex., assignor, by mesne assignments, to Standard Oil Development Company, Elizabeth, N. J., a corporation of Delaware Application March 10, 1952, Serial No. 275,810

5 Claims. (Cl. 340—400)

This invention relates to electrical means for producing acoustic pulses. More particularly, the invention relates to a transducer system which is useful in the generation of acoustic pulses such as may be employed in the determination of seismic velocities in wells or may be used in the measurement of distances by timing the elapsed time between the transmission of an acoustic impulse and the return of an echo.

Briefly stated, my invention contemplates a system including an electrostatic capacitor which alternately may be charged from a source of electric power and may be discharged through a low inductance transducer to produce an acoustic wave, or pulse, of short duration and steeply rising amplitude. The novel transducer of my invention comprises two substantially identical spiro-form coils of wire, or equivalent electrical conductor, secured together in abutting and coaxial relationship, and electrically connected in series in a manner such that a surge of electric current caused to flow in one of the coils also flows in series opposition in the other coil. The magnetic field induced around the conductor forming one coil has a polarity which opposes the field induced around the conductor forming the second coil thereby tending to force the coils apart. By suitably restraining movement of the coils with respect to each other, the transducer of my invention may be caused to produce relatively high amplitude pulses of acoustic energy.

Figure 1:
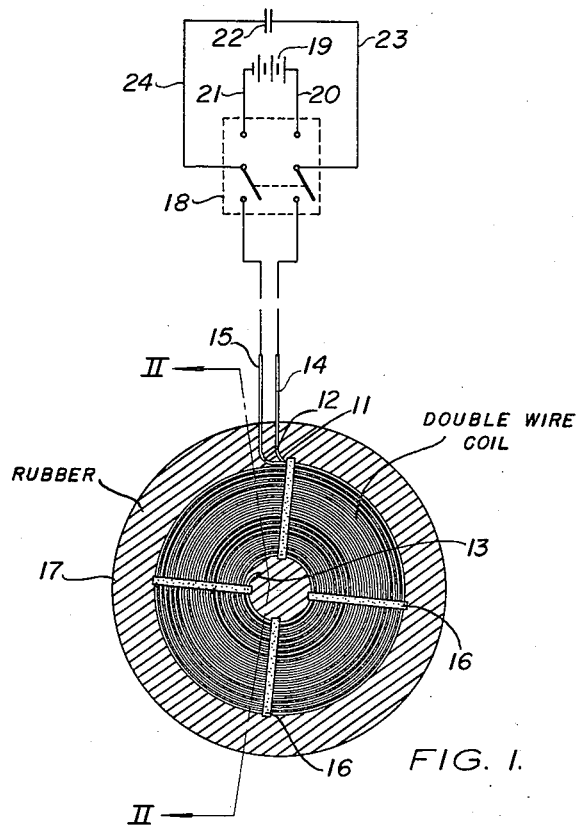

The nature and objects of my invention may best be understood by reference to the following description of the accompanying drawing in which Figure 1 is an elevation view, partly in section, of a transducer in accordance with my invention, and includes a schematic diagram of one electrical circuit which is adapted to energize said transducer.

Figure 3:
Figure 2:
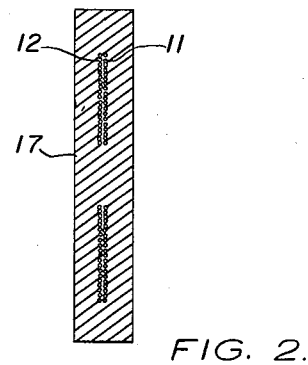
Figure 4:
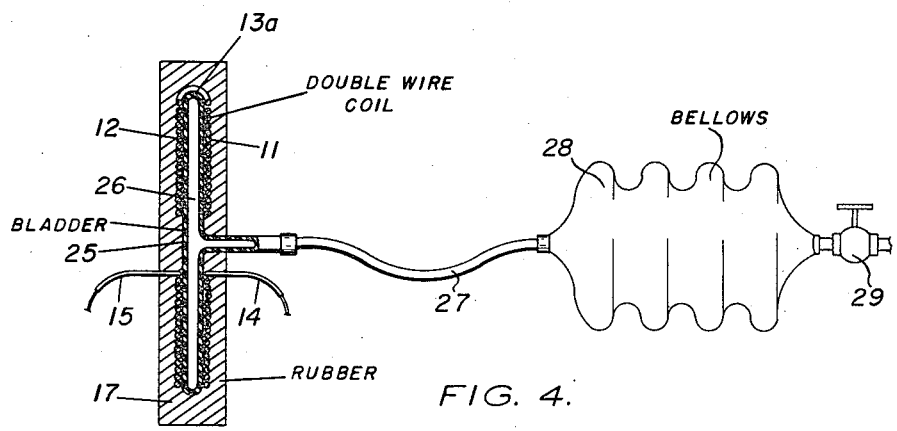

Figure 2 is a transverse sectional view of the transducer shown in Figure 1, taken along the section line II—II thereof, Figure 3 is a perspective view of a preferred detail shown in Figure 1, and Figure 4 is a transverse sectional view of a modified embodiment of the transducer illustrated in Figure 1.

Referring to the several figures, wherein like reference characters indicate like parts, the numerals 11 and 12 designate two spirally wound coils formed from electrically insulated wire or equivalent conductor. As will be apparent from the showing in the drawing, spirally wound coils 11 and 12 are substantially identical flat coils and are preferably abutted one against the other in coaxial relationship so that the spiralled turns of one coil are substantially parallel to the corresponding turns of the other coil. Rather than abut against each other the two coils may, in some instances, be arranged in close proximity to each other so that the two coils are spaced a small distance apart in parallel and coaxial relationship as will be more fully explained with respect to the showing in Figure 4.

As a matter of convenience, coils 11 and 12 may be formed from a single length of conductor folded upon itself, as represented by the loop 13 shown in Figures 1 and 3, to provide two substantially equi-length and parallel portions of conductor having free ends 14 and 15. The two portions of conductor may then be simultaneously wound to form the two flat coils. If desired, however, coils 11 and 12 may be independently formed from two separate lengths of conductor. It is important, nevertheless, that the dimensions of the two coils be substantially the same and that corresponding ends of the two portions be electrically connected in series so that an electric current which is caused to flow, for example, from the outer turn toward the inner turn in one coil also flows from the inner turn towards the outer turn in the other coil. In other words, the coils must be electrically connected in series opposition.

It may be seen from the drawing that the loop or series connection 13 is shown near the center of the two coils while the free ends 14 and 15 are led off from the circumferential turns. If desired, the series connection 13 may be formed between circumferential turns of the coils and the free ends 14 and 15 may be taken off near the center thereof. From the drawing it may also be seen that the coils 11 and 12 are shown in the form of Archimedean spirals, i. e. spirals in which the spacing of adjacent turns is substantially uniform. Equivalent results may be obtained if adjacent turns are not uniformly spaced but diverge along the plane of the coil in a progressively increasing or decreasing amount, or if the turns of each coil, instead of generating a generally circular pattern, progress in spiral-like manner and generate a mono-planar coil having a polygonal perimeter provided that both coils are substantially identical and are secured together in substantially parallel and coaxial relationship. Where used in the appended claims, the term "spiro-form coil" will be understood to designate generically a monoplanar, or pancake type, coil in which successive turns progress outwardly in a spiral-like manner from a central axis that is perpendicular to the plane of the coil, said coil having either a generally circular or polygonal perimeter of four or more sides as described above.

After the two coils 11 and 12 have been formed, they may be securely bound together by toroidally winding several turns of cord or tape around portions thereof as indicated at 16 in Figures 1 and 2. In a preferred embodiment of my invention, however, the coils 11 and 12 are further secured together by enclosure in a dense, resilient rubber casing 17 which is vulcanized after the coils have been embedded therein and impregnated thereby. Resilient rubber compositions having suitable acoustic properties are well known in the prior art.

A transducer of the above-described type has very low inductance because of the bifilar nature of the winding of the two coils and may be effectively excited by a surge of current derived from an electrostatic capacitor to produce a sharp acoustic pulse of short duration and steeply rising amplitude. One embodiment of an electrical circuit adapted to energize the transducer is shown schematically in Figure 1. In this embodiment the leads 14 and 15 are connected to two contacts of a suitable switching means 18, such as a double pole, double throw switch or relay. A source of unidirectional electric potential, such as a battery 19, is connected through conductors 20 and 21 to two other contacts of switching means 18. Also an electrostatic capacitor 22 may be connected through conductors 23 and 24 to other contacts of switching means 18.

As may be seen from the drawing, capacitor 22 is so connected to switching means 18 that its terminals may be switched in series with the terminals of potential source 19, thereby causing capacitor 22 to accumulate a charge substantially equal to the potential of source 19. Thereafter, capacitor 22 may be switched so that its terminals are in series with coils 11 and 12 thereby causing a surge of current to flow through the coils until capacitor 22 is substantially discharged. The instantaneous surge of current flowing, for example, from capacitor 22 through conductor 23, coil lead 14, coil 11, loop 13, coil 12, coil lead 15, conductor 24, and thence back to capacitor 22 causes an instantaneous building up of an electrostatic field of one polarity about each of the turns of coil 11 and another electrostatic field of opposite polarity about the turns of coil 12. Because of the intensities of the two opposing fields and the proximities of one to the other, the coils tend to be forced apart and thereby produce a sharp, high intensity acoustic pulse which is useful in many operations such as involve the travel time of acoustic pulses.

Although the electrical system which may be used to produce a surge of current in series through the spiro-form coils has been illustrated by an electrostatic capacitor, a switching means and a source of potential for charging the capacitor, it will be apparent to workers in the art that other electrical systems may also be used to produce a transient or a periodic flow of current in these coils and thereby produce a sharp acoustic pulse or rapid series of pulses.

Referring now to the modified embodiment of my invention illustrated in transverse sectional view in Figure 4 of the drawing, it may be seen that coils 11 and 12 have been formed with a common junction 13a between circumferential turns of two substantially identical spiro-form coils whose free ends 14 and 15 are taken off at the central turns. A resilient, rubber bladder 25, defining a relatively thin, gas-filled cavity 26 conforming approximately to the area of the coils, is sandwiched between coils 11 and 12. Similar to the embodiment illustrated on Figures 1 and 2, coils 11 and 12 and bladder 25 may be encased and vulcanized within a dense, resilient rubber casing 17. A hollow tubular member 27 is arranged with one end communicating into cavity 26 and the other end communicating into the interior of an external sac or bellows 28. The purpose of bladder 25, tubular member 27, and bellows 28 is to provide means for equalizing hydrostatic pressure upon opposite faces of each of the coils in instances where the transducer of my invention is subjected to pressures substantially above atmospheric pressure. If the transducer illustrated in Figures 1 and 2 is employed where large hydrostatic pressures exist on the exterior thereof, and no means, such as the bladder 25 and bellows 28 of Figure 4, are provided to equalize the interior and exterior pressures, the acoustic energy output of the transducer will be considerably reduced below that obtainable at normal atmospheric pressures. The pressure equalizing system comprising bladder 25, tubular member 27 and bellows 28 may suitably be provided with valve means 29 for filling said system with a compressible fluid or gas, such as air, or the like.

The transducer and system of my invention may be further illustrated by a description of a practical embodiment wherein a suitable length of Number 17 B. & S. gauge, fiberglass insulated copper wire was folded upon itself and formed into two Archimedean spiral coils approximately 3.5 inches in diameter and each containing 26 turns. After binding the coils together in coaxial, abutting relationship, they were embedded and vulcanized within a dense, resilient rubber casing having a total diameter of 4.5 inches and a thickness of about 1 inch, care being taken to eliminate voids and other acoustic discontinuities in the rubber casing. When this transducer was energized by discharging therethrough the electrostatic charge from a 20 microfarad bank of condensers which had previously been charged to 1500 volts, a high intensity acoustic impulse was produced.

Having now described and illustrated my invention by reference to specific embodiments, I wish it to be understood that my invention is not limited to the specific form or arrangement of parts herein described and shown, and many changes may be made without departing from the spirit and scope of the appended claims.

I claim:

1. A system for converting electric energy to acoustic energy comprising two elongated and substantially equi-length portions of metallic conductor electrically joined in series at one end and providing a free end of each portion, said portions being formed into two substantially identical spiro-form coils, means for electrically insulating successive turns of said coils, a vulcanized rubber body having said coils encased and embedded therein in close proximity and coaxial relationship to each other, and means electrically connected to the free ends of said portions for producing a transient flow of current therein.

2. A system for converting electric energy to acoustic energy having a wave front of steeply rising amplitude comprising an electrically insulated wire folded upon itself to provide two substantially equi-length portions electrically connected in series and each having a free end, said portions being formed into two substantially identical Archimedean spirals, means for securing said spirals in abutting proximity and coaxial relationship to each other, and means including a source of unidirectional potential, an electrostatic capacitor, and switching means for alternately connecting said capacitor to said source of potential and to the free ends of said wire for producing a transient flow of current therein whereby current flowing in one spiral flows in series opposition in the other spiral and the magnetic fields induced in the respective spirals oppose each other.

3. A transducer for converting electric energy to acoustic energy comprising an elongated and electrically insulated conductor folded upon itself to provide two substantially equi-length portions electrically connected in series and each having a free end, said portions being formed into two substantially identical spiro-form coils, a vulcanized rubber body having said coils encased and embedded therein in abutting proximity with corresponding turns thereof substantially parallel, and means for connecting a source of electric energy to said free ends.

4. A transducer for converting electric energy to acoustic energy comprising two elongated and substantially equi-length portions of metallic conductor electrically joined in series at one end and providing a free end of each portion, said portions being formed into two substantially identical spiro-form coils, means for electrically insulating successive turns of said coils, means for securing said coils in close proximity and coaxial relationship to each other, means for equalizing hydrostatic pressures on opposite faces of each of said coils, and means for connecting a source of electric energy to said free ends.

5. A transducer in accordance with claim 4 in which said means for securing the coils comprises vulcanized rubber having said coils encased and embedded therein, and said means for equalizing hydrostatic pressures includes a resilient member defining a gas filled cavity sandwiched between said coils.

WHITMAN D. MOUNCE.

References Cited in the file of this patent

UNITED STATES PATENTS

| Number | Name | Date |
|---|---|---|
| 314,155 | Taylor | Mar. 17, 1885 |
| 1,743,265 | Depew | Jan. 14, 1930 |